(12) United States Patent
Occhipinti

(10) Patent No.: US 7,110,571 B2
(45) Date of Patent: Sep. 19, 2006

(54) SMART OPTICAL SENSOR FOR AIRBAG SYSTEMS

(75) Inventor: Luigi Occhipinti, Ragusa (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 750 days.

(21) Appl. No.: 10/001,909

(22) Filed: Oct. 31, 2001

(65) Prior Publication Data
US 2002/0105177 A1    Aug. 8, 2002

(30) Foreign Application Priority Data
Nov. 3, 2000    (IT)    ............................ TO2000A1038

(51) Int. Cl.
*G06K 9/00*    (2006.01)
(52) U.S. Cl. ..................................... 382/104
(58) Field of Classification Search ................ 382/104; 701/45, 46; 348/148; 280/752, 753
See application file for complete search history.

(56) References Cited

U.S. PATENT DOCUMENTS

| | | | |
|---|---|---|---|
| 5,140,670 A * | 8/1992 | Chua et al. ............... | 706/29 |
| 5,687,249 A * | 11/1997 | Kato ........................ | 382/104 |
| 5,983,147 A * | 11/1999 | Krumm | |
| 6,099,030 A * | 8/2000 | Kraft ....................... | 280/735 |
| 6,712,387 B1 * | 3/2004 | Breed et al. ............. | 280/735 |
| 6,724,920 B1 * | 4/2004 | Berenz et al. ............ | 382/118 |
| 2002/0097900 A1 * | 7/2002 | Arena et al. ............. | 382/129 |

FOREIGN PATENT DOCUMENTS

| | | |
|---|---|---|
| DE | 0 903 672 A2 | 3/1999 |
| EP | 1 043 682 A1 | 10/2000 |
| WO | WO 00/38949 | 7/2000 |
| WO | WO 00/38949 A2 | 7/2000 |
| WO | WO 02/30717 A1 | 4/2002 |

OTHER PUBLICATIONS

Dominguez-Castro et al; "0.8-$\mu$m CMOS two dimensional programmable mixed-signal focal-plane array processor with on-chip binary imaging and instructions storage," IEEE Journal of Solid-State Circuits, vol.: 32, Issues: 7, pp. 1013-26, Jul. 1997.*

* cited by examiner

*Primary Examiner*—Andrew W. Johns
*Assistant Examiner*—Shervin Nakhjavan
(74) *Attorney, Agent, or Firm*—Lisa K. Jorgenson; E. Russell Tarleton; Seed IP Law Group PLLC

(57) ABSTRACT

A sensor having an array of photo sensitive elements for acquiring images of the passenger compartment in a motor vehicle and a circuit for processing the signals corresponding to the images generated by said photo sensitive elements. The processing circuit is configured according to a cellular neural network processing architecture of the image signals and can generate an output signal indicating the decision on whether to deploy an airbag to which the sensor is associated or to control the explosion of the airbag. Preferably, the photo sensitive array and the processing circuit are comprised on a single integrated component, preferably implementing CMOS technology.

20 Claims, 4 Drawing Sheets

SMART OPTICAL SENSOR FOR AIRBAG SYSTEMS

BACKGROUND OF THE INVENTION

1. Field of the Invention

This invention relates to airbag systems and, more particularly to an optical sensor for automobile "smart" airbag systems.

2. Description of the Related Art

Airbags are fitted on practically all new cars. Airbags are devices that are currently acknowledged as being effective in reducing road accident mortality for both drivers and passengers.

While performing this safety function, however, it has been reported that airbags can sometimes injure users.

Typically, an airbag inflates in approximately 0.06 seconds, at an inflation speed which can also be in the order of 320 km/h (200 mph). This rapidity in deployment is essential, since a typical car crash lasts for approximately 0.125 seconds. The vehicle occupants who are not protected can collide with the structures of the passenger compartment before the collision comes to an end. In other words, this second crash or collision occurs while the first crash or collision is still in progress.

Usually, airbags are deployed by means of a gas generator that produces the volume of gas required by means of a rapid combustion of a compound (usually sodium based). This combustion is extremely fast and can, in actual fact, be compared to a small, contained explosion.

Airbag deployment is usually controlled by a processor which, according to the signals received from respective sensors, determines whether to deploy the airbag considering the severity of the accident or not. This occurs on the basis of algorithms that account for the change in vehicle speed and, in the most recent systems, on other factors related to the conditions in which the rapid vehicle deceleration occurs.

The sensors used as usually linear accelerometers, which number and characteristics are adapted according to factors such as the position of the airbag and its function (e.g., front airbag, side airbag, etc.).

As mentioned above, there are situations in which the airbags can cause negative effects. As experience in the use of airbags is being accumulated, the knowledge of such negative effects, which in some cases can have very serious consequences, is being developed.

Usually, the most negative effects are found in relation to individuals who are very close to the airbag when it is deployed. This situation can occur, particularly, to short occupants, children and, in general, to passenger compartment occupants who are either not wearing seat belts or wearing seat belts incorrectly or setting in relatively unusual positions when airbag expansion starts.

These situations can involve, for example, drivers who sit very close to the steering wheel or infants travelling in restraint systems fitted on the front seats, also facing backwards.

The need to improve the functional characteristics of airbags to ensure the protection of all occupants, regardless of their height or build, or whether they are wearing seat belts or not, has also been officially expressed by organizations such as the NHTSA, National Highway Traffic Safety Administration, in the USA. This need particularly refers to the risks to which children, specifically infants, are exposed.

In this perspective, newly designed airbag systems (currently called "smart" airbags) are being developed. These systems, for example, use a weight sensor to trigger the airbag only when a corresponding minimum weight is detected in the corresponding seat. This solution also avoids possible useless deployment of the airbag located in the position corresponding to the seat destined to be occupied by the passenger sitting next to the vehicle driver when this seat is empty.

For example, CTS Corporation has recently developed a number of weight sensors based on film resistors capable of being used in the context of these airbag systems.

There are other systems which, in order to reduce the risks to which the occupants who are too close to the airbag when it is deployed are exposed, regulate the deployment speed of the airbag according to the severity of the collision, particularly by detecting the position of the person immediately before starting airbag deployment or by reducing the deployment force if the person risks being injured.

Usually, the operation of these systems is based on the integration of data from various sensors, such as weight sensors, roll-over sensors, seat belt sensors, side crash sensors and crash intensity sensors, etc. The characteristics of the collision and the position of the occupants determine which airbags to trigger. There are also more complex systems that also control the restraint system (in terms of energy and time) according to the data received from the sensors.

Various different solutions have been presented in patent literature as specifically concerned the detection of the position of occupants in the vehicle passenger cabin.

For example, U.S. Pat. No. 5,330,226 describes a system comprising a shift sensor for signalling the distance between the position of the airbag and the person. For this purpose, an infrared sensor is fitted in the upper part of the passenger cabin over the person.

Patent U.S. Pat. No. 5,528,698 describes a system with image sensor and processor. The sensor is a photo detector array sensor with lens assembly and the processor capable of processing the image thus obtained to acquire the occupancy status of the passenger seat area in the passenger cabin.

In U.S. Pat. No. 5,612,876 a system is described for detecting occupancy in the passenger compartment, particularly to inhibit the deployment of the airbag when no occupant is present. The respective sensor presents a front sensing region and a rear sensing region, which can be evaluated separately.

Moreover, WO-A-94/22693 describes a position sensor employing ultrasound, microwave or optical technology, so to ensure a long sensing time before the occupant crashes into the airbag.

Finally, Ep-A-0 781 589 describes the use of a crash sensor adapted to provide a first signal, a retention system comprising an optical image sensor destined to generate a second signal and a controller, which provides a third signal and an activation system.

BRIEF SUMMARY OF THE INVENTION

The disclosed embodiments of the invention provide an optical sensor susceptible of being advantageously integrated in an newly-designed airbag system, so to additionally increase performance.

According to one embodiment, an optical micro sensor, implemented in CMOS technology, in which the optical chip consists of an array of photo sensors with inputs on rows and columns guided by an internal logic controller is provided.

In accordance with one aspect of this embodiment, a single optical sensor capable of acquiring and processing images in real-time in order to store the image in the passenger cabin before and after the collision is provided.

In the currently preferred embodiment, each image processing operation is implemented, having defined certain parameters, by letting the dynamic system characterising the processing unit evolve from the initial stage to the final stabile stage and store the resulting image in a local memory.

The completely acquired image is stored internally as a voltage value (pixel per pixel). The signal that manages and controls airbag enabling is linked to the biases of the images stored in continuous instants of time, in addition to the occupancy status inside the passenger compartment.

Particularly, the solution according to this embodiment of the invention implements the sensing and processing function of the respective signals on a single chip.

Another embodiment of this invention employs a cellular neural network (CNN) as a distributed and parallel computing system for signal processing, thus avoiding digitalization and the consequent sequential image processing. Given equality of other factors, this provides a considerable increase in processing speed with respect to sensors requiring image signal digitalisation.

The sensor of this invention can be used primarily in association with front airbags.

The possibility of estimating the occupant's collision speed, i.e., the occupant's frontal acceleration during the crash, can be exploited to deploy the airbag in a controlled way.

An important additional advantage of the disclosed embodiments of this invention is that it can be used to reconstruct the event after the collision, practically acting as a "black box" recorder of the vehicle.

BRIEF DESCRIPTION OF THE SEVERAL VIEWS OF THE DRAWINGS

The embodiments of the present invention will be better explained by the following detailed descriptions with reference to the accompanying figures as non-limiting examples, wherein.

DETAILED DESCRIPTION OF THE INVENTION

One embodiment of this invention concerns an optical sensor 1 that can be associated with a system 2 adapted to control the possible deployment of an airbag (or airbag system) 3 associated to a seat that can be occupied by one of the occupants P in the passenger compartment of a motor vehicle (not illustrated in general).

Figure 1:
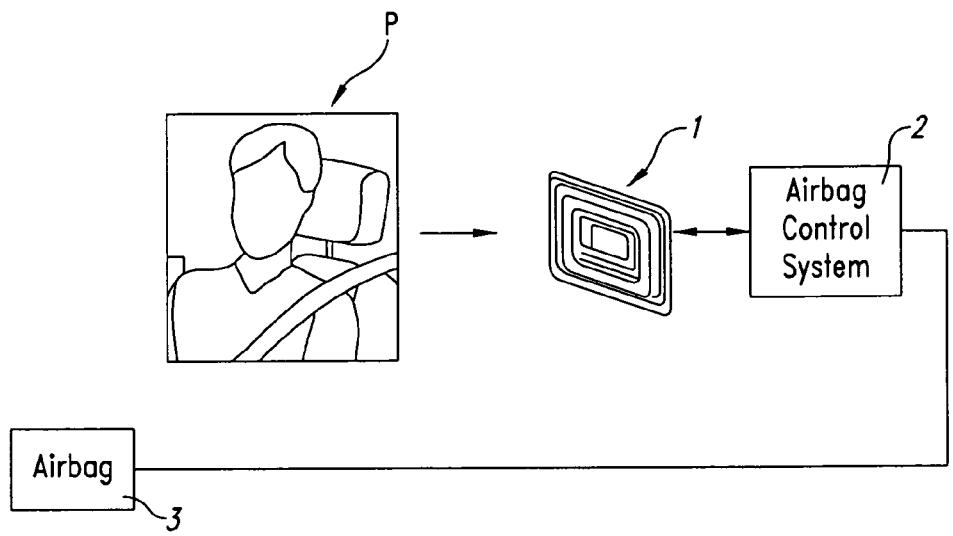
FIG. 1 illustrates a typical practical arrangement of a sensor according to this invention in general terms, FIGS. from 2 to 4 illustrate the circuit and structural characteristics of the sensor according to this invention on different levels.

Particularly, the sensor 1 according to one embodiment of this invention comprises an array of light sensitive elements (for example, photo diodes or photo transistors forming an array) adapted to be fitted in the passenger compartment in a configuration (focus lens, etc.) for producing electrical signals corresponding to an image of the part of the passenger compartment where the occupant (driver or passenger), indicated with letter p in FIG. 1, may be, on said array.

The general criteria for configuring the sensor 1 as an optical sensor for producing the image are intrinsically known and for this reason do not require a detailed explanation herein. This is also because these criteria are not intrinsically essential for understanding this invention. This also essentially refers to the control criteria of the airbag 3 by the controlling system 2, unless other detailed explanations are provided in the description that follows.

The sensor 1 preferably implements CMOS technology and comprises an optical chip consisting of an array of photo sensors with inputs on rows and columns guided by an internal logical controller.

The sensor 1 comprises an "analog" part containing n×m cells, each with a specific optical sensor related to a respective pixel.

Figure 2:
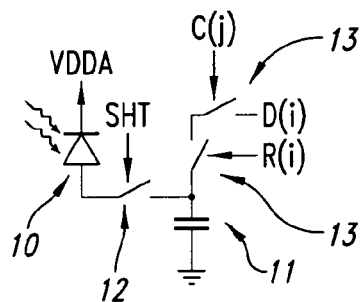

Although reference can be made to different layouts, the currently preferred embodiment of the single cell is shown in FIG. 2, wherein numeral 10 indicates the photo sensor or photoelectric converter, which can be either a photo diode, a photo transistor or an equivalent component. It is adapted to charge a capacitor (or, in general, a capacitance) 11 so that the quantity of charge stored in the capacitor 11 corresponds to the time integral of the photo current generated by the sensor 10 over the exposure time determined by operating a switch 12 controlled by the control circuit of the sensor (non explicitly illustrated in FIGS. 2 and 13, intrinsically of the type widely known).

In FIG. 2, numeral 13 generally indicates two additional switches, also controlled by said control system, which are used to detect the charge level of the condenser 11 to obtain the processing functions which are better described below.

Particularly, supposing static images during acquisition, the charge accumulated by the capacitor 11 is proportional to the radiance on the surface of the optical sensor, which is double the integer over time and wavelength of the incident light. This all accounting for the spectrum response curve of the photo diode.

Figure 3:
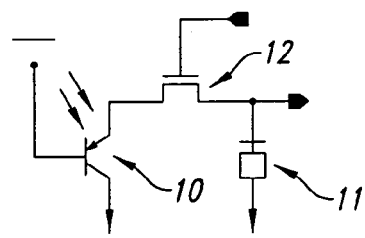

Particularly, the diagram in FIG. 3 illustrates in greater detail the possible practical implementation of the diagram in FIG. 2 with CMOS technology (p-bulk) using the vertical bipolar transistor comprised between the bulk P, the diffusion of the well n and the diffusion p+.

The diagram in FIG. 3 (which refers to the possible implementation of the circuit using 0.35 micron CMOS technology) shows that the base coupling-collector of the transistor, being arranged between the bulk P and the well n, is polarised in the opposite direction.

Consequently, the diffusion of the well n, which is sufficiently wide, is the active area of the sensor where the incident light can generate the electron-hole pairs underlying the reversed conduction of the coupling. The switch 12 is used to control the flow of current from the base emission coupling to the capacitor 11. The voltage collected on the capacitor 11 is proportional to the quantity of incident light on the surface of the sensor having established the conduction time (on-time) of the switch 12.

The value of the capacitance 11 is linked mainly to the leakage current and to the time required for image acquisition. In practice, the capacitor 11 is charged during image acquisition and discharged during the reading operation, for which the storage/reading operation time is proportional to the value of the capacitance.

On the other hand, low capacitance values mean low current values, which are more influenced by leakage currents.

Figure 4:
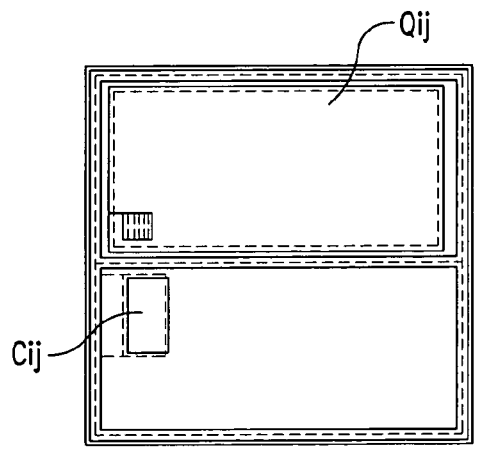

FIG. 4 shows with greater clarity that the well island n destined to implement the active area of the optical sensor (with reference to the image pixel generally identified by $Q_{ij}$, according to a typical array order in rows and columns) can be entirely separated by another island (generally indicated by $C_{ij}$, specifically for highlighting the direct correspondence with the respective pixel) which contains the other devices, i.e., the switch 12 and the logic circuits on a local level.

For immediate quantitative reference, in the currently preferred embodiment, the capacitance 11 has a value of 0.36 pF with wider sink n base and active area p+ of 5×5 microns. With reference to said values, assuming leakage current at current value, the voltage values can be stored for times that are sufficiently long to ensure the charge with short exposure times and charging the capacitor 11 throughout its dynamic range (typically comprised between 0 volts and approximately 3.3 volts) in only 1, 2 microseconds.

The circuit described above can be used to detect the image directly on-chip, with an operation implemented in parallel on all pixels.

Particularly, extremely high on-chip acquisition and processing speeds, specifically in the range from 10,000 to 50,000 frames per second, can be obtained by implementing a cellular neutral network (CNN) based architecture—as described in greater detail below with a computational capacity in the order of 1 to 2 Tera-operations per second, which is considerably higher than the normal image processing frequency, in the order of 30 frames per second.

In order to attain on-chip real-time processing capacity, each pixel is locally connected to a unit or processing cell which is capable of implementing the following equations:

$$\tau dx_{ij}/dt = -g(x_{ij}) + \Sigma A(l, m) \cdot x_{lm} \Sigma B(l, m) \cdot u_{lm} + I_{bias}$$

where the summations are extended to all values (l, m) belonging to the neighborhood N(Cij), $$g(X_{ij}) = \begin{cases} X_{low} & \text{if } X_{ij} < X_{low} \\ X_{high} & \text{if } X_{ij} > X_{high} \\ 0 & \text{otherwise} \end{cases}$$

$X_{ij}$ and $u_{ij}$ are the input voltage and the status voltage of the cell $C_{ij}$, respectively (see FIG. 4), $N(C_{ij})$ is the radius 1 of the cell $C_{ij}$, and A, B and $I_{bias}$ are check parameters which values affect the performance of the system in processing the acquired image.

In greater detail, A and B are 3×3 matrixes while $I_{bias}$ is a single offset voltage value.

The formula mentioned above can be re-conducted to the general cellular neural network (CNN) paradigm described in U.S. Pat. No. 5,140,670 to which useful reference can be made for additional details on image processing.

Figure 5:
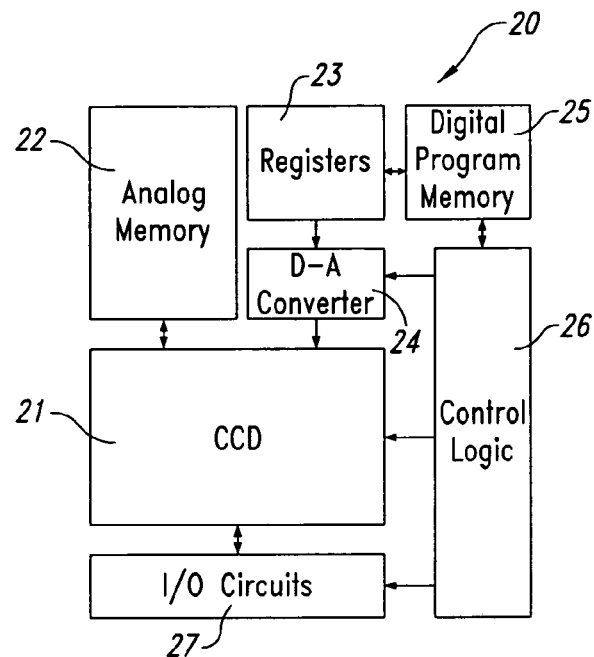
FIGS. 5 and 6 illustrate the implementation method of a cellular neutral network in the context of a sensor according to this invention in greater detail.

FIG. 5 is a block diagram illustrating the possible implementation of a check device that can be associated and factually integrated with the optical sensor assembly described above so to create a single device which is that referred to with numeral 1 in FIG. 1.

Particularly, in the architecture diagram shown in FIG. 5, numeral 21 indicates the array (typically a matrix) of analog cells comprising the optical sensors $Q_{ij}$ locally interconnected to the adjacent cells by a set of programmable weight and difference parameters, i.e., the factors A, B and $I_{bias}$ seen above, forming the configuration parameters of the neural network.

Numeral 22 indicates an internal analog memory for temporary storing the cell intermediate values during processing, i.e., one or more of the images acquired by the optical sensor.

Numeral 23 indicates a set of digital registers for storing the programming and configuration parameters destined to be transmitted to the array 21 after conversion in analog format via a digital analog converter 24.

Numeral 25 on the other hand indicates a digital program memory (configured, for example, as flash memory, EPROM or SRAM with external memory interface), while numeral 26 refers to a control logic, which governs all the elements in the architecture with the additional possibility of working as a decoder when reading the processing results generated by the array 21 of analog cells.

Finally, numeral 27 indicates the total of input-output, circuits (which can be either analog or digital) for external interfacing and chip programming.

Interactions between the blocks from 21 to 27 (which are obvious for those of skill in the art) are shown by either one-way or two-way arrows in the FIG. 5.

Essentially, each processing step is implemented by fixing the known values of the aforesaid parameters and letting the system evolve dynamically from an initial status from the stabile, final condition, consequently storing the resulting image in the local memory.

As known (see, for example, CNN Software Library—Templates and Algorithms—version 7.3, ANL—Budapest, August 1999), operational methods on single images as well as on double images can be implemented in the so-called universal CNN machines.

Once the image has been fully acquired (with an acquisition time that depends on the chip resolution and the respective technology), it is stored internally as a set of analog voltage values (pixels per pixel), adapted then to be directly processed on-chip according to the proposed architecture.

All the required processing steps can be implemented with this architecture, so to originate a single on-chip solution in view of the use as a visual micro sensor.

Figure 6:
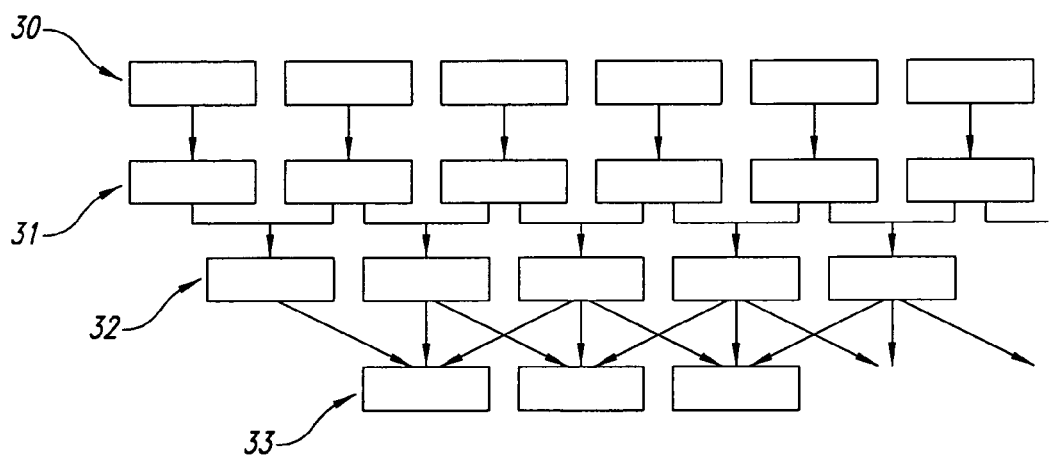
Figure 7:
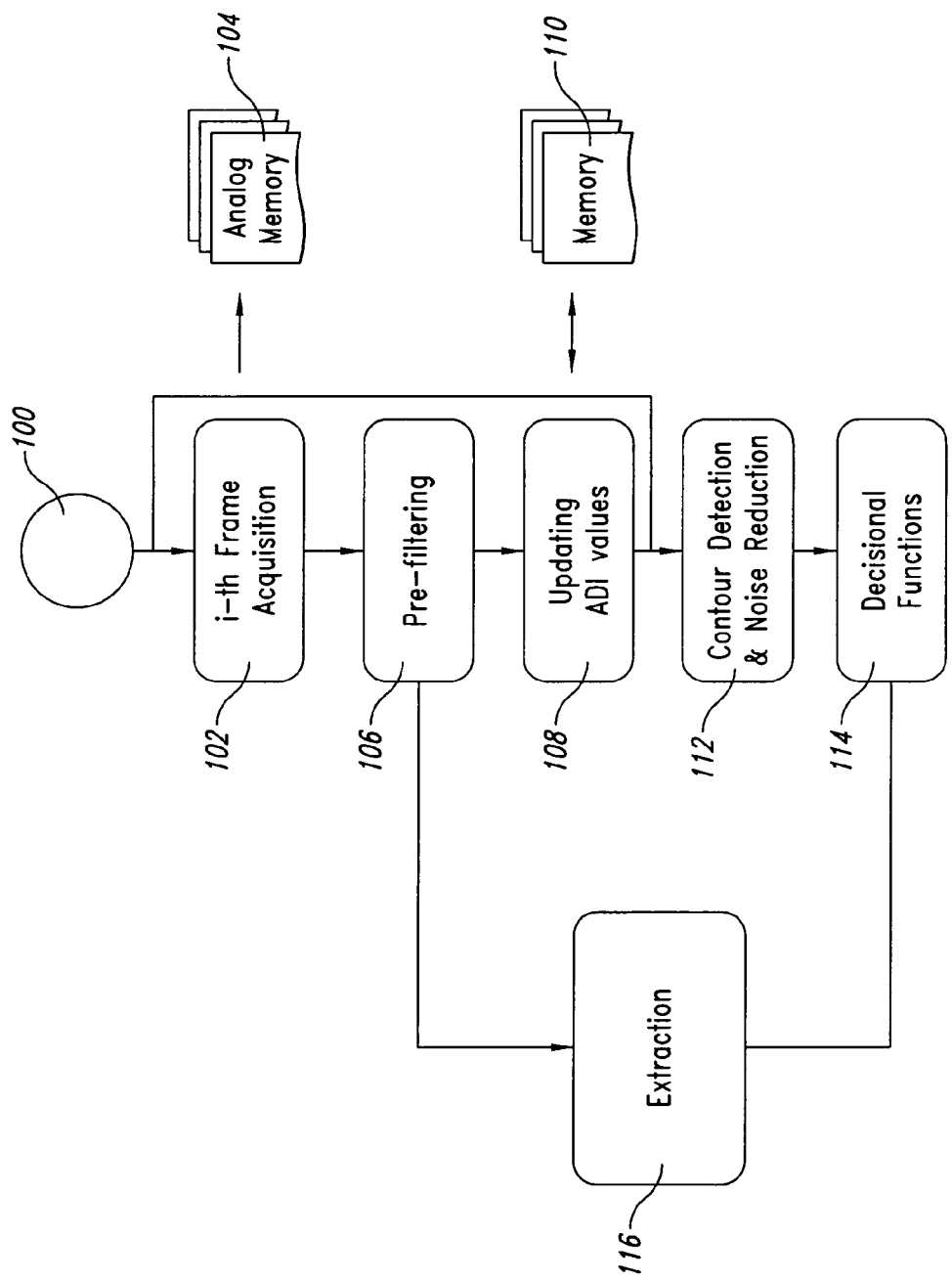
FIGS. 7 and 8 are two flow charts illustrating the operating method of a system comprising a sensor according to this invention in detail.

As concerns, for example, the dynamic image processing steps, the chart in FIG. 7 shows an ADI (Accumulative Difference Image) filtering layout implemented by combining the single image processing steps and computing the differences on a pixel-per-pixel basis.

particularly, the diagram in FIG. 6 shows how filtered data sets (generally indicated with numeral 31)—which continue to refer to the single frames—can be obtained by pre-filtering starting from the data related to the single frames (frame 1, frame 2, . . . ), respectively. Difference data (reference numeral 32) are then obtained by a differential operation on subsequent frames. The ADI filtering action results are obtained by means of an accumulation process on sets which, in the example shown, comprise three groups of consecutive differential data.

Naturally, ADI filtering is only one of the possible various processing functions which can be implemented by a sensor according to this invention with the method described above.

Some methods for selecting the parameters A, B and $I_{bias}$ related to the different processing functions are described below, for example, with reference to the equations mentioned above, to explain the possible cellular neural network operation.

a. ADI Calculation

This operation processes, for example, two subsequent images (frames) to eliminate the static part of the image by filtering. According to this layout, the "different" images are stores twice or more to obtain a grey-scale image representing the moving parts in the most recent frames in the original sequence.

Logical difference (input array=frame t−1, initial status=frame t).

$$A = \begin{bmatrix} 0 & 0 & 0 \\ 0 & 2 & 0 \\ 0 & 0 & 0 \end{bmatrix}$$

$$B = \begin{bmatrix} 0 & 0 & 0 \\ 0 & -1 & 0 \\ 0 & 0 & 0 \end{bmatrix} \quad I_{bias} = -1$$

Difference+noise filtering (input array=frame t−1), initial status=frame t).

$$A = \begin{bmatrix} 0 & 0 & 0 \\ 0 & 1 & 0 \\ 0 & 0 & 0 \end{bmatrix}$$

$$B = \begin{bmatrix} 0.25 & 0.25 & 0.25 \\ 0.25 & 2 & 0.25 \\ 0.25 & 0.25 & 0.25 \end{bmatrix} \quad I_{bias} = -4.75$$

b. Thresholding

This method is used to obtain binary images from a grey-scale. The threshold value is established by the current $I_{bias}$ value, according to the luminance values to be treated, whereby allowing the possibility of obtaining variable thresholding according to the average luminance of the set, i.e., adaptive thresholding.

$$A = \begin{bmatrix} 0 & 0 & 0 \\ 0 & 2.5 & 0 \\ 0 & 0 & 0 \end{bmatrix}$$

$$B = \begin{bmatrix} 0 & 0 & 0 \\ 0 & 0 & 0 \\ 0 & 0 & 0 \end{bmatrix} \quad -1 < I_{bias} < 1$$

c. Noise Reduction 1 (Smoothing)

This method is used to filter some noise effects during image acquisition. The output image is binary (black or white pixels). Note that for operation in normal light conditions, the smoothing function is capable of working directly on grey-scale images, without requiring preventive thresholding.

$$A = \begin{bmatrix} 0 & 1 & 0 \\ 1 & 2 & 1 \\ 0 & 1 & 0 \end{bmatrix}$$

$$B = \begin{bmatrix} 0 & 0 & 0 \\ 0 & 0 & 0 \\ 0 & 0 & 0 \end{bmatrix} \quad I_{bias} = 0$$

d. Contour Detection

This operation identifies the contour of a single image so to allow detecting difference objects in the observed set (for example, in the concerned case, the passenger cabin occupant, the seat belt, etc.).

$$A = \begin{bmatrix} 0 & 0 & 0 \\ 0 & 1 & 0 \\ 0 & 0 & 0 \end{bmatrix}$$

$$B = \begin{bmatrix} 0 & -0.5 & 0 \\ -0.5 & 2 & -0.5 \\ 0 & -0.5 & 0 \end{bmatrix} \quad I_{bias} = -0.8$$

This type of segmentation can also be implemented by means of other operators, for example by computing gradient and spatial filtering.

e. Noise Reduction 2 (Small Object Deletion)

Isolated pixels and small objects may remain after ADI calculation due to inaccuracies in the image acquisition operations. The purpose of this operation is to eliminate this type of noise which can be recognized as isolated pixels or small groups of pixels, by filtering.

$$A = \begin{bmatrix} 1 & 1 & 1 \\ 1 & 2 & 1 \\ 1 & 1 & 1 \end{bmatrix}$$

$$B = \begin{bmatrix} 0 & 0 & 0 \\ 0 & 0 & 0 \\ 0 & 0 & 0 \end{bmatrix} \quad I_{bias} = 0$$

The various processing functions described above can be integrated to originate algorithms that can be run under the control of the program memory 25 (see chart in FIG. 5), transferring the corresponding sets of parameters A, B, and $I_{bias}$ retrieved from the registers 23 and converted in analog format by the converter 24 to the array 21.

The flow chart in FIG. 7 illustrates a possible algorithm that can be implemented by the circuit in FIG. 5.

It is emphasised once again that the solution according to this invention allows the integration of the image acquisition function and the image processing function on a single component. The latter function is implemented according to methods (using a cellular neural network, or CNN) ensuring processing times which, with equality of all other parameters, are considerably lower than the results which can be obtained by means of solutions in which the signals corresponding to the acquired images in the form of analog signals must be converted in digital format to be processed (which furthermore is essentially serial).

Additionally, the solution according to this invention can fully exploit the implementation potentials of cellular neural networks on CMOS level. Useful reference can be made on this matter to the work by T. Roska and A. Rodriguez-Vazquez, "Review of CMOS implementations of the CNN Universal Machine-Type Visual Microprocessors", in proc. of Iscas 2000—Geneva, 2000.

Particularly, in the diagram in FIG. 7, starting from step 100, numeral 102 indicates the step in which the "i-th" frame is acquired (according to known criteria). The frame is stored in the analog internal memory 22 in the step referred to with numeral 104.

In a subsequent step, or set of steps, collectively indicated with numeral 106, the recently acquired image and/or set of previously acquired images is subjected to pre-filtering, e.g., on the basis of the thresholding and noise reduction (smoothing) algorithms described above.

According to specific application needs, evolution can lead from step 106 to step 108 in which the ADI calculation is implemented (according to the methods described above). Step 108 is normally implemented interactively by updating the ADI values stored in the memories 22 (step 110).

Subsequently, the system evolves to step 112 (which—at least in some applications—can directly follow the starting step 100) and converges towards a set of decisional functions, collectively indicated with numeral 114, which is described in greater detail below.

Step 112 usually consists in contour detection and noise reduction destined to delete small objects according to the method described above.

Reference numeral 116 illustrates a set of other operations that can be implemented, in intrinsically known ways, to obtain an extraction function of the characteristics of the static image (contour detection, diagonal line imaging, contour filling, application of various logical operators, etc.). This procedure is applied on the pre-filtered image obtained in step 106 in view of the use of the respective results in the context of the decisional function indicated with numeral 114.

Figure 8:
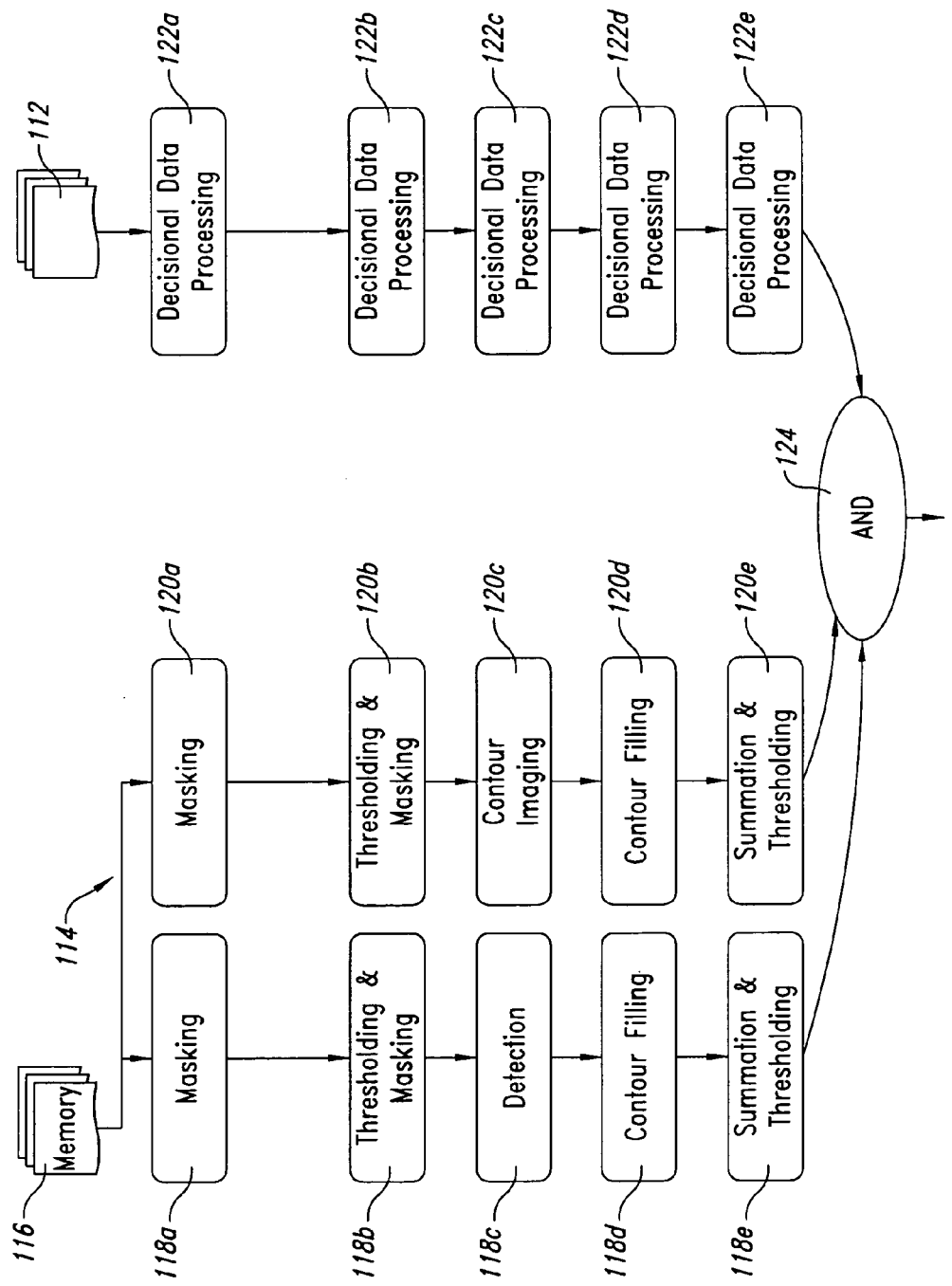

This fact is better shown in the chart in FIG. 8 that illustrates, as a non-limiting example, the possible processing method of the data resulting from the processing sequences which are completed in the steps indicated with numerals 112 and 116 in the chart in FIG. 7.

Essentially, the decisional function shown in chart 8 enables, according to the final result sent to block 2 in FIG. 1, determination the activation method of the airbag 3, particularly to establish whether, when, and how to deploy the airbag 3.

Considering the need to essentially implement a triggering, i.e., controlled activation, function, the simplest method consists in evaluating the average intensity value of all the pixels of the image obtained at the end of dynamic segmentation, after having verified the established enabling conditions by means of static image processing. For this purpose, it is important to consider the possibility offered by cellular neural networks of also carrying out logical operations (by means of suitable parameter sets) between either two image or two image processing intermediate steps. This is obtained by setting one of the two images as an input map (u) and the other as an initial status map (x0) of the network.

A detail of the chart in FIG. 8 refers, again as a non-limiting example, to a decisional sequence articulated in three sections destined to be implemented preferably concurrently.

The first section, comprising the steps shown in sequence with references 118a and 118e, essentially corresponding to a decision on the seat occupancy associated to the controlled airbag 3.

The first operation corresponds to a masking function to isolate the area near the head restraint (step 118a).

The following stage consists in differential processing of the video sequences with or without occupancy (or occupied by an adequately tall person). This process is illustrated by steps 118b (thresholding and masking), 118c (detection and contour closing), 118d (contour filling) and 118e (pixel value summation and thresholding).

The final result is available as a signal which, by weighing implemented by the results of the concurrent sequences described below (e.g., by means of a logical operator AND, represented by block 124) allowing to send a signal indicating whether the airbag should be activated or not to the control unit 2.

The operative sequence represented by the blocks from 120a to 120e essentially comprises operations which are similar to those described above with reference to the sequence shown in blocks from 118a to 118e and aims at evaluating the use of seat belts. A possible difference is in that imaging and contour closing, in view of the subsequent filling of these contours in step 118d, step 120c, consists in imaging the contours diagonally connected in view of the subsequent closing and filling of these contours in step 120d, in order to better classify the seat belt object.

The operative sequence shown in blocks from 122a to 122e is different from the one described above in that its contents is essentially dynamic. The objective of the sequence 122a–122e is that of providing decisional data based on the speed at which, for example, the driver tends to collide with the steering wheel block following a frontal collision, i.e., in general, on the speed of movement of any object in the passenger compartment by effect of frontal, lateral or composite collisions.

As mentioned, step 124 generally indicates a weighing function (herein shown in the form of a simple AND operator, but actually susceptible of corresponding to more sophisticated logical criteria, also fuzzy) directed to produce the signal of possible selective deployment to the module 2 in FIG. 1 according to the results obtained in the various processing sequences 118a. 118e; 120a–120e and 122a–122e.

The threshold level established for the average intensity value of the pixels can be varied according to the required sensitivity and response speed of the airbag system, in addition to the acceleration (negative) of the vehicle in a collision. The average intensity value of the pixels which exceeds this threshold level, indicating the estimated collision speed, which can be used to control the airbag system deployment.

The threshold level is also used to convert the colour image into a black and white image can be dynamically optimised according to the average luminosity of the pixels in the original image, whereby implementing thresholding function of the adaptive kind.

Naturally, numerous changes can be implemented to the construction and forms of embodiment of the invention herein envisaged, all comprised within the context of the concept characterizing this invention, as defined by the following claims and the equivalents thereof.

What is claimed is:

1. A smart optical sensor for use in airbag systems having at least one airbag associated with passenger compartments of motor vehicles, the sensor comprising: an array of photo sensitive elements for acquiring images of the passenger compartment, and a circuit for processing the signals corresponding to said images generated by said photo sensitive elements, said processing circuit configured according to a cellular neural network processing architecture of said image signals, said processing circuit adapted to generate, as a function of said image signals, an output signal corresponding to motion of the passenger and indicating the deployment modalities of the airbag to which the sensor is associated in response to the motion of the passenger.

2. The sensor of claim 1 wherein said array of photo sensitive elements and said processing circuit are comprised in a single integrated component.

3. The sensor of claim 1 wherein said cellular neural network comprises a plurality of cells each associated with a respective photo sensitive element of said array.

4. The sensor of claim 3 wherein said cells and respective photo sensitive element are implemented in separate islands in a CMOS technology well.

5. The sensor of claim 1 wherein said photo sensitive elements comprise a coupling area between a bulk and a CMOS technology well forming the photo sensitive area.

6. The sensor of claim 1 wherein said processing circuit comprises:
at least one analog memory for storing image data by photo sensitive elements of said array, and
a control logic for executing real-time image processing sequences in said cellular neural network.

7. The sensor of claim 6 wherein said processing circuit comprises means for storing configuration parameters for said cellular neural network.

8. The sensor of claim 7 wherein said configuration parameters are stored in digital form and said processing circuit comprises a digital-analog converter for converting said parameters in analog format in view of being supplied to said cellular neural network.

9. The sensor of claim 1 wherein said processing circuit is configured to carry out at least one of the following operations:
thresholding,
noise reduction by smoothing,
cumulative difference calculating between images or ADI,
contour imaging,
noise reduction by small object deletion,
contour closing,
closed contour filling,
diagonally connected contour imaging, and
movement speed detection of an object in said images.

10. The sensor of claim 1 wherein said processing circuit is configured to implement a combination operation of the processing results obtained in relation to at least two separate images of the passenger compartment.

11. The sensor of claim 10 wherein said combination operation is a logical product.

12. The sensor of claim 10 wherein the result of said combination operation identifies said output signal as indicative of the decision whether to deploy the associated airbag or not.

13. The sensor of claim 10 wherein the result of said combination operation identifies said output signal as indicative of the control action of the deployment mechanism of the associated airbag.

14. The sensor of claim 10 wherein at least two of said separate images comprise a substantially static image and a plurality of dynamic images of the passenger compartment.

15. The sensor of claim 1, comprising memory means for storing said images of the passenger compartment for later playback.

16. An optical sensor for use in airbag systems having at least one airbag associated with a passenger compartment of a motor vehicle, the sensor comprising:
an array of photosensitive elements configured to acquire images of the passenger compartment; and
a processing circuit coupled to the array of photosensitive elements and configured to receive signals corresponding to the images generated by the photosensitive elements, the processing circuit configured according to a cellular neural network processing architecture configured to generate, as a function of the image signals, at least one output signal corresponding to motion of the passenger and indicating deployment modalities of the airbag to which the sensor is associated in response to motion of the passenger, the processing circuit comprising:
at least one analog memory configured to store image data corresponding to the images generated by the photosensitive elements; and
a control logic circuit for executing real-time image processing sequences in the cellular neural network.

17. An optical sensor for use in airbag systems having at least one airbag associated with a passenger compartment of a motor vehicle, the sensor comprising:
an array of photosensitive elements configured to acquire images of the passenger compartment; and
a processing circuit coupled to the array of photosensitive elements and configured to receive signals corresponding to the images generated by the photosensitive elements, the processing circuit configured according to a cellular neural network processing architecture configured to generate, as a function of the image signals, at least one output signal corresponding to acceleration of the passenger and indicating deployment modalities of the airbag to which the sensor is associated, the processing circuit comprising:
at least one analog memory configured to store image data corresponding to the images generated by the photosensitive elements;
a control logic circuit for executing real-time image processing sequences in the cellular neural network; and
a circuit configured to store configuration parameters for the cellular neural network in digital form, the processing circuit further comprising a digital-analog converter for converting the parameters into analog format to be received by the cellular neural network.

18. An optical sensor for use in airbag systems having at least one airbag associated with a passenger compartment of a motor vehicle, the sensor comprising:
an array of photosensitive elements configured to acquire images of the passenger compartment of the motor vehicle; and
a processing circuit coupled to the array of photosensitive elements and configured to receive signals generated by the photosensitive elements that correspond to images of the passenger compartment, the processing circuit configured according to a cellular neural network processing architecture adapted to generate, as a function of the image signals generated by the photosensitive elements and acceleration of the passenger calculated therefrom, at least one output signal indicating deployment modalities of the airbag, the processing circuit configured to carry out at least one of the following operations:
thresholding,
noise reduction by smoothing,
cumulative difference calculating between images or ADI,
contour imaging,
noise reduction by small object deletion,
contour closing,
closed contour filling,
diagonally connected contour imaging, and
movement speed detection of an object in said images.

19. An optical sensor for use in airbag systems having at least one airbag associated with a passenger compartment of a motor vehicle, the sensor comprising:
an array of photosensitive elements configured to acquire images of the passenger compartment of the motor vehicle; and
a processing circuit coupled to the array of photosensitive elements and configured to receive signals generated by the photosensitive elements that correspond to images of the passenger compartment, the processing circuit configured according to a cellular neural network processing architecture adapted to generate, as a function of the image signals generated by the photosensitive elements, at least one output signal corresponding to acceleration of the passenger and indicating deployment modalities of the airbag in response to passenger acceleration, the processing circuit configured to carry out at least one of the following operations:
thresholding,
noise reduction by smoothing,
cumulative difference calculating between images or ADI,
contour imaging,
noise reduction by small object deletion,
contour closing,
closed contour filling,
diagonally connected contour imaging, and
movement speed detection of an object in said images;
the processing circuit further configured to implement a combination operation of the processing results obtained in relation to at least two separate images of the passenger compartment generated by the array of photosensitive elements.

20. An airbag system for use in a passenger compartment of a motor vehicle, the system comprising:
an airbag;
an array of photosensitive elements configured to be mounted in the passenger compartment and to acquire images of the passenger compartment and to generate therefrom signals corresponding to the images of the passenger compartment; and
a processing circuit coupled to the array of photosensitive elements, the processing circuit comprising a cellular neural network processing architecture configured to receive the image signals from the array of photosensitive elements and to generate therefrom at least one output signal corresponding to acceleration of the passenger and indicating deployment modalities of the airbag; and
a memory circuit for storing images of the passenger compartment generated by the array of photosensitive elements for later playback.

* * * * *